United States Patent [19]
Damiano

[11] 4,129,685
[45] Dec. 12, 1978

[54] FUEL CELL STRUCTURE
[75] Inventor: Paul J. Damiano, Manchester, Conn.
[73] Assignee: United Technologies Corp., Hartford, Conn.
[21] Appl. No.: 824,766
[22] Filed: Aug. 15, 1977
[51] Int. Cl.² .................. H01M 4/96; H01M 4/86
[52] U.S. Cl. .................................... 429/38; 429/44
[58] Field of Search .............. 429/38, 41, 27, 209, 429/40, 44

[56] References Cited
U.S. PATENT DOCUMENTS

| | | | |
|---|---|---|---|
| 2,924,634 | 2/1960 | Fischbach et al. | 429/27 |
| 2,997,518 | 8/1961 | Klappet et al. | 429/27 |
| 3,810,789 | 5/1974 | Vermeulen et al. | 429/209 |
| 4,038,463 | 7/1977 | Lamarine et al. | 429/41 |

Primary Examiner—John A. Mack
Assistant Examiner—H. A. Feeley
Attorney, Agent, or Firm—Stephen E. Revis

[57] ABSTRACT

In a stack of electrochemical cells, such as fuel cells, distinct channels behind each electrode for carrying reactant gas are eliminated by using highly porous gas distribution layers, such as porous electrode substrate material. This gas distribution layer must be sufficiently thick and have enough pores sufficiently large to permit a substantially free flow of reactant gas therethrough both perpendicular to and parallel to the catalyst layer.

14 Claims, 2 Drawing Figures

FUEL CELL STRUCTURE

BACKGROUND OF THE INVENTION

1. Field of the Invention

This invention relates to fuel cells and more particularly to a stack of fuel cells.

2. Description of the Prior Art

A basic fuel cell comprises an anode electrode spaced apart from a cathode electrode with an electrolyte disposed therebetween in a compartment formed between the two electrodes. Typically each electrode comprises a thin catalyst layer adjacent to the electrolyte and disposed upon a layer of support material usually called the electrode substrate. Behind the substrate is a reactant gas compartment. The substrate is gas porous perpendicular to its thickness so that reactant gas which is fed into the compartment behind the electrode substrate diffuses therethrough to the catalyst layer. An electrochemical reaction occurs at the gas/electrolyte/catalyst interface whereby ions travel from one electrode to the other through the electrolyte.

Commercially useful amounts of electric power require stacking a plurality of cells and connecting them electrically in series. Electrically conductive gas impermeable plates separate the anode of one cell from the cathode of the next adjacent cell. These separator plates include ribs (or other protrusions) on each side thereof which contact the electrode substrates. The ribs provide paths for the current to flow from one cell to the next while defining reactant gas compartments (such as channels) behind each substrate. In this manner gas is distributed over the back surface of each electrode. The ribs or protrusions also provide structural rigidity to the stack of cells and support to the electrodes which are usually made as thin as possible. A fuel cell stack constructed in accordance with the foregoing description is shown in commonly owned U.S. Pat. No. 3,994,748 to H. R. Kunz and C. A. Reiser.

Ribbed gas separator plates are expensive to make; and the ribs (or any other type of protrusions) create other problems, such as maldistribution of the reactant gas to the catalyst layer. For example, direct perpendicular passage (through plane) of the reactant gas to the catalyst layer through the areas of contact between the separator ribs and electrode substrate is blocked. Reactant gas must diffuse in plane through the substrate under the ribs to reach catalyst disposed on the substrate directly beneath the ribs. This diffusion is made more difficult because the substrate layer is somewhat compressed directly under the ribs and may be only several mils thick prior to compression.

The voltage across a stack of fuel cells is the sum of the voltage gains across the individual cells, which is a function of the current produced by each cell. The current passes perpendicular to the plane of the electrodes from one end of the stack to the other. The current density through a stack of cells is equal to the current divided by the cross-sectional area through which the current passes at any particular cross-sectional plane. It is a constant at any one particular plane for any one particular power setting. If the cross-sectional area through a plane is reduced and total electric power generated is held constant, the current density must increase in that plane. Voltage losses are directly proportional to the current density; thus, at constant power, voltage is lost whenever the cross-sectional area through which the current passes is reduced. Such an area reduction occurs at the interface between the electrodes and the ribs or other protrusions of the separator plates since the contact area between the plates and the electrodes may only be on the order of 50% of the electrode cross-sectional area. Because perfect contact even between flat mating surfaces is impossible to achieve, there are also contact losses at every interface between adjacent components, particularly if they are not bonded together.

Satisfactory solutions for eliminating the above-discussed problems are continually being sought, but until the present invention have not been found.

SUMMARY OF THE INVENTION

One object of the present invention is to increase the contact area between adjacent electrochemical cell components thereby reducing contact losses.

Another object of the present invention is a fuel cell stack whose components may be manufactured more economically.

A further object of the present invention is an ability to reduce the thickness of an electrochemical cell and consequently reduce the height of a stack of fuel cells.

Yet another object of the present invention is to reduce maldistribution of the reactant gas to the catalyst layers of an electrochemical cell.

Accordingly, in the present invention a gas separator is disposed between and spaced from the anode and cathode catalyst layers of adjacent cells of a cell stack and is a gas impermeable plate or layer. Porous members fill the space on each side of the separator and each member is in substantially continuous contact with both the separator and one of the catalyst layers. Each porous member includes a gas distribution layer sufficiently thick and having enough pores sufficiently large to permit a substantially free flow of reactant gas therethrough parallel to as well as perpendicular to the planes of its surfaces.

This invention eliminates the gas distribution compartments or spaces formed between the separator and the electrodes, such as were previously formed, for example, by ribs in a separator plate. Reactant gas is introduced into the cell through, for example, the edge of the gas distribution layer in a direction parallel to the plane of the gas distribution layer. The gas distribution layer is highly gas porous in that direction, as well as through plane, thereby permitting gas to flow over the entire surface of the catalyst layer. Continuous contact (i.e., no ribs) between the porous member and the separator greatly increases the contact area between these components and thereby reduces voltage losses and improves current distribution through the stack. The porous member may also serve as the substrate for the catalyst layer.

It is expected that manufacturing costs can be reduced since the separator may now be made as a flat, thin sheet, or layer of gas impermeable material. On the other hand, the gas distribution layer will generally be thicker than prior art catalyst substrate layers and have larger pores in order to permit in-plane gas flow with tolerable pressure drops. In its thicker form the gas distribution layer provides the structural support previously provided by the ribbed separator. It is expected that the overall height of the fuel cell stack will be reduced, although a height reduction is certainly not mandated by the present invention.

In accordance with another aspect of the present invention, the porous members may be bonded to each side of the gas separator layer, and, in turn, catalyst layers could be applied to the opposite faces of the porous members thereby forming a unitized fuel cell stack component. An electrolyte retaining matrix layer could be applied to one of the catalyst layers to form a complete fuel cell stack building block.

As used herein and in the appended claims, "layer" is used in a broad sense and may be a thin or thick coating as well as a self-supporting sheet or plate. Also, although "layer" is a singular noun, in this application a "layer" may include more than one layer.

The foregoing and other objects, features and advantages of the present invention will become more apparent in light of the following detailed description of preferred embodiments thereof.

DESCRIPTION OF PREFERRED EMBODIMENTS

Figure 1:
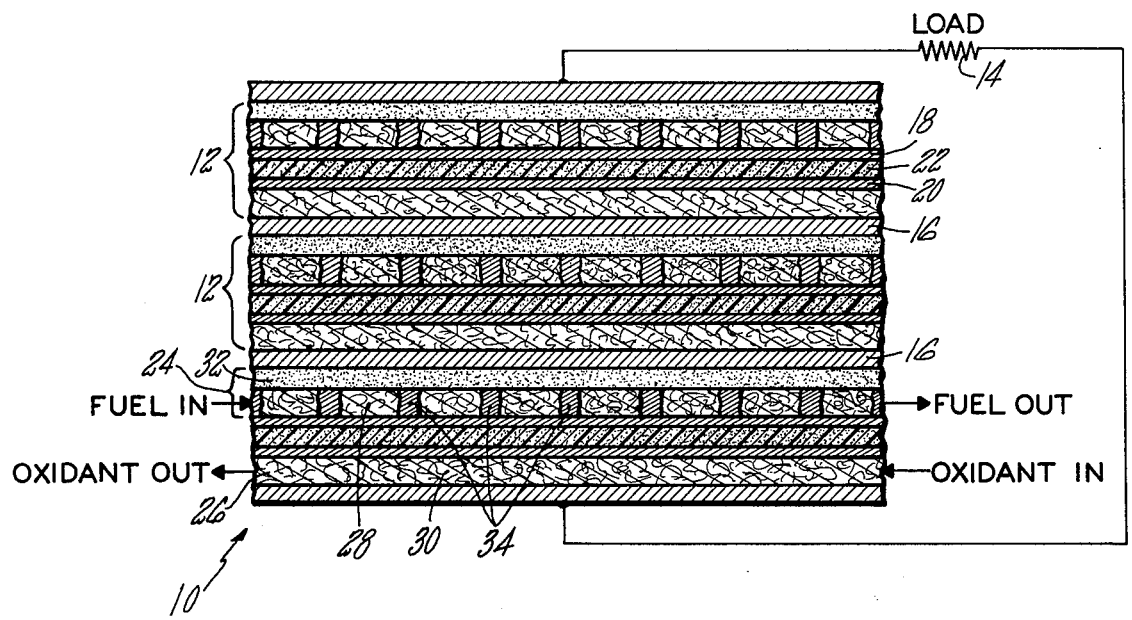
FIG. 1 is a cross-sectional representation of a stack of electrochemical cells according to the present invention.

FIG. 1 shows a fuel cell stack 10 in accordance with an exemplary embodiment of the present invention. The cell stack 10 includes a plurality of fuel cells 12 connected electrically in series through a load 14. Electrically conductive separators 16 are disposed between adjacent cells and prevent mixing of the reactants flowing through the cells on each side of the separators.

Each cell 12 includes an anode catalyst layer 18 spaced apart from a cathode catalyst layer 20 with an electrolyte retaining matrix layer 22 sandwiched therebetween and in substantially continuous contact with the surfaces of each of the catalyst layers. Each cell 12 also includes a porous member 24 disposed behind and filling the space between the anode catalyst layer 18 and the separator 16, and a porous member 26 disposed behind the cathode catalyst layer 20 and the separator 16. Each of the porous members 24, 26 fills the space between and is in substantially continuous contact with the surfaces of the catalyst layer and separator on each side thereof.

In accordance with the present invention, the porous members 24, 26 include gas distribution layers 28, 30, respectively. Each gas distribution layer is in substantially continuous contact with essentially the entire surface of its associated catalyst layer 18, 20. In this embodiment each porous member 24 includes an electrolyte reservoir layer 32 for storing excess electrolyte volume during cell operation. The reservoir layer 32 is a flat, continuous layer of hydrophilic material disposed between the separator 16 and the gas distribution layer 28 and in continuous contact with the surfaces thereof. Impregnations of hydrophilic material form uniformly distributed hydrophilic, small pore regions 34 through the gas distribution layer 28, and provide liquid communication or wicking paths from the catalyst layer 18 to the reservoir layer 32, in a manner analogous to that shown in FIG. 2 or 3 of commonly owned U.S. Pat. No. 3,905,832 to J. C. Trocciola, incorporated herein by reference.

Reservoirs for storing excess electrolyte are well known in the art. Commonly owned U.S. Pat. No. 3,634,139 shows a reservoir which is external to the fuel cell. A fuel cell which uses an external reservoir would not require a reservoir layer such as the layer 32 shown in FIG. 1. Other types of reservoir layers are shown in commonly owned U.S. Pat. No. 3,748,179 to C. L. Bushnell and in aforementioned U.S. Pat. No. 3,905,832. The fuel cells shown in those patents include reservoir material behind at least one of the electrodes of the fuel cell; however, note that provisions are always made to provide a reactant gas compartment behind each electrode. The arrangement shown in the embodiment of FIG. 1 is considerably simpler than the arrangements shown in the latter two patents.

The gas distribution layers 28, 30 are each highly gas porous both perpendicular to and parallel to the planes of their surfaces. Reactant gas is distributed to the catalyst layers by introducing gas into the gas distribution layers 28, 30 via one of the edges of the gas distribution layers as depicted by the arrows 31. The reactant gas travels across the cell (horizontally in the figure) and to the catalyst layer (vertically in the figure) through the pores of the gas distribution layers and unconsumed reactant exhausts on another side of the cell through one of the other edges of the gas distribution layer as depicted by the arrows 33. In this regard, the critical characteristics of the gas distribution layer are that it be sufficiently thick and have enough pores sufficiently large to permit a substantially free flow of the reactant gas therethrough both parallel to and perpendicular to the planes of its surfaces. This is in addition to other well-known requirements of fuel cell components, such as electrical conductivity, compatibility with the electrolyte, and suitable strength. The phrase "substantially free flow" as used herein and in the appended claims simply means that the pressure drop across the gas distribution layer (both in plane and through plane) is at an acceptably low level. What is acceptable will vary according to cell materials and design as well as other specifications which may be imposed as a result of the application for which the stack is intended. For example, the higher the pressure drop from an inlet edge of the gas distribution layer to an outlet edge the more energy required to pump the reactant gas through the cell. Any energy used to pump reactants is energy lost, and efficiency of the system is thereby reduced. Also, higher pressure drops from edge to edge tend to create higher pressure differentials across the matrix layer 22 and will result in either reactant gas crossover from one side of the matrix to the other or electrolyte being forced out of the matrix if the pressure difference is too high.

In a phosphoric acid electrolyte fuel cell stack according to the present invention the gas distribution layer might be made, for example, from the same fibrous carbon paper electrode substrate material described in commonly owned U.S. Pat. No. 3,972,375 to R. D. Breault, except the substrate would be made thicker and with larger diameter carbon coated carbon fibers than might otherwise have been used in order to increase pore size. Some calculations have been made which assume a square cell 47 centimeters on a side, reactants at 50 psia, phosphoric acid electrolyte, an operating temperature of 375° F., oxygen utilization of 0.7, and hydrogen utilization of 0.9. Reactant utilization ($H_2$ or $O_2$) is the mass flow rate of the reactant at either the anode or the cathode which is consumed in the cell by the electrochemical reaction divided by the mass flow rate of the reactant into the cell. Under these conditions it was calculated that a carbon paper substrate (made similar to the substrate of the aforementioned Breault patent) 80% porous and 0.05 inch thick would have an acceptable edge to edge in-plane pressure drop of 0.5 inch of water at a current density of 100 amps per square foot if the carbon coated carbon fiber diameter were 0.01 inch for the oxygen gas distribution layer and 0.008 inch for the hydrogen gas distribution layer. Larger thicknesses and fiber diameters would also be acceptable.

United States patent application Ser. No. 824,759 titled CARBON FOAM FUEL CELL COMPONENTS by D. Maricle and D. Nagle, filed on even date herewith and incorporated herein by reference, teaches that the gas distribution layers 28, 30 may be made from open cell vitreous carbon foam.

The separators 16 may now be made as thin, flat plates rather than as relatively thick, ribbed plates. In all other respects they may be made in the same manner and of the same materials as described in the prior art, such as the graphite composite plates made as described in either of commonly owned U.S. Pat. Nos. 3,801,374 to G. H. Dews and R. W. Vine or 3,634,569 to R. C. Emanuelson and W. L. Luoma, which are incorporated herein by reference.

In accordance with one aspect of the present invention the separator 16 could be bonded to the surfaces of the porous members 24, 26 on each side thereof, and the catalyst layers 18, 20 of adjacent cells could be bonded to the opposite surfaces of the porous members, thereby forming a unitized component. These components could be used in putting together a fuel cell stack by placing them one upon the other with an electrolyte matrix layer 22 disposed therebetween. Bonding of the catalyst layers to the porous members can be accomplished by a variety of known techniques, such as by applying the catalyst layers to the gas distribution layers using the screen printing, spraying, or filtration-transfer technique. Also, if desired, the matrix layer could be bonded to one or the other of the catalyst layers as part of the unitized component; or a half thickness matrix layer could be bonded to each of the catalyst layers. If the matrix were made from resin bonded silicon carbide, it could be applied by the screen printing process taught in commonly owned U.S. Pat. No. 4,001,042 by J. C. Trocciola, D. E. Elmore, and R. J. Stosak. This would result in unitized fuel cell stack components which could be stacked directly one atop the other to form the fuel cell stack. Bonding the various layers together increases the surface contact area therebetween thereby reducing voltage losses and improving current distribution through the stack. The present invention does not require that the various layers be bonded together.

Figure 2:
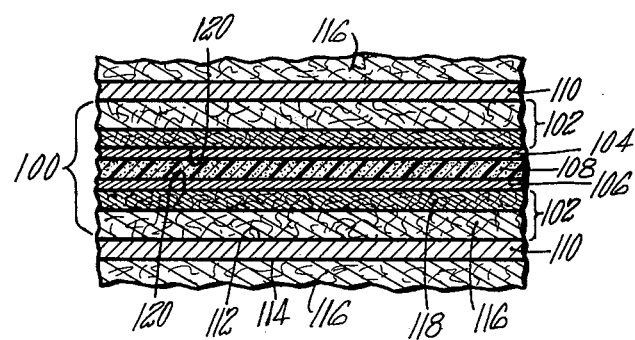
FIG. 2 is a cross-sectional representation of a stack of electrochemical cells according to another embodiment of the present invention.

FIG. 2 shows another embodiment of the present invention. In this embodiment there is no separate reservoir layer for storing excess electrolyte. This embodiment is particularly well suited for cells having external electrolyte reservoirs. It may also be used if the gas distribution layer has a suitable range of randomly distributed pore sizes, wherein the smaller pores become filled with excess electrolyte while the larger pores always remain open, as is taught in commonly owned U.S. patent application Ser. No. 719,877 to Paul E. Grevstad filed on Sept. 1, 1976 and issued as U.S. Pat. 4,035,551 on July 12, 1977.

In the embodiment of FIG. 2 an electrochemical cell 100 is one of several disposed one atop the other to form a stack of cells. Each cell 100 comprises a pair of gas distribution layers 102, an anode catalyst layer 104, and a cathode catalyst layer 106. The catalyst layers are spaced apart and include an electrolyte retaining matrix layer 108 sandwiched therebetween. The cell stack includes gas separators 110 disposed between adjacent cells 100. The gas distribution layers on each side of a separator 110 are in substantially continuous contact with the opposing surfaces 112, 114 of the separator.

In this embodiment each catalyst layer 104, 106 is bonded to the surface of its respective gas distribution layer 102. If the pores of the gas distribution layer are too large, the catalyst layer may, when applied, penetrate the gas distribution layer to an unacceptable extent rather than stay, as desired, substantially on the surface. This problem is avoided by the embodiment of FIG. 2 wherein each gas distribution layer 102 includes a relatively thick, large pore layer 116 adjacent the separator layer and a thinner, smaller pore layer 118 adjacent the catalyst layer. The large pore layer 116 is sifficiently thick and includes enough pores sufficiently large to permit a substantially free flow of a reactant gas therethrough both perpendicular to and parallel to the planes of its surfaces, and may be of a material similar to that described with respect to the gas distribution layer 26 of FIG. 1. The layer 118 provides a small pore surface 120 onto which the catalyst layers 104, 106 may be applied without the catalyst layer material penetrating the gas distribution layer 102 to an excessive depth. This is desirable in order to maximize the useful catalyst surface area.

The smaller pore layer 118 may be made of the same material as the larger pore layer 116. For example, both may be made of open cell vitreous carbon foam as described in the aforementioned U.S. patent application Ser. No. 824,759. Alternatively, the larger pore layer 116 may be made of open cell vitreous carbon foam and the smaller pore layer may be made in the same manner as any prior art substrate material adapted to have a catalyst layer applied to the surface thereof, as exemplified by the method for forming a substrate taught in the aforementioned Breault U.S. Pat. No. 3,972,735. The smaller pore layer 118 may be either a separate layer from the layer 116 or it may be formed, for example, by a suitable impregnation, to a shallow depth, of the catalyst facing surface of the larger pore layer 116, thereby reducing the effective pore size at least near the surface thereof. As with FIG. 1, the various layers of this embodiment may be bonded to each other over their abutting surfaces to form unitized components which may be placed one atop the other to form the fuel cell stack. Whether or not the gas distribution layer 102 actually requires a smaller pore catalyst substrate layer adjacent the catalyst layer will depend upon several factors including (1) whether or not and how the catalyst layer is to be applied (i.e., bonded) to the surface of the gas distribution layer; (2) the composition of the catalyst layer; and (3) the pore size of the larger pore layer 116.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In a cell stack comprising a plurality of electrochemical cells, each cell comprising an anode catalyst layer spaced apart from a cathode catalyst layer, the space therebetween adapted to have electrolyte disposed therein, the improvement comprising:

a pair of gas distribution layers each having first and second opposing surfaces, said first surfaces facing each other; and a continuous layer of gas impermeable material disposed between and in substantially continuous contact with both of said first surfaces, said second surface of one of said pair of gas distribution layers being in substantially continuous contact with the cathode catalyst layer of one of said fuel cells, and said second surface of said other gas distribution layer being in substantially continuous contact with the anode catalyst layer of the next adjacent cell, wherein said gas distribution layers are gas porous, the gas distribution layers being sufficiently thick and including enough pores sufficiently large to permit a substantially free flow of a reactant gas therethrough both perpendicular to and parallel to the planes of their surfaces, each of said gas distribution layers also including a thin fine pore layer defining said second surface and a thicker larger pore layer behind said fine pore layer, said fine pores sized to permit a catalyst layer to be applied thereto without a substantial amount of catalyst entering said pores, at least one of said pair of gas distribution layers including means defining an electrolyte reservoir region in communication with the electrolyte space between said catalyst layers.

2. The improvement according to claim 1 wherein said means includes a plurality of uniformly spaced impregnations of hydrophilic material.

3. The improvement according to claim 1 wherein said pair of gas distribution layers are bonded to said layer of gas impermeable material over said entire first surfaces of said gas distribution layers thereby forming a unitized structure.

4. The improvement according to claim 3 wherein said anode and cathode catalyst layers are bonded to their respective gas distribution layer over said entire second surfaces thereof, said unitized structure now including said catalyst layers.

5. The improvement according to claim 4 wherein each of said cells includes a matrix layer adapted to retain electrolyte, said matrix layer including a surface bonded to and in substantially continuous contact with either of said catalyst layers of said unitized structure, said unitized structure now including said matrix layer.

6. The improvement according to claim 5 wherein said cell stack comprises a plurality of said unitized structures, the non-bonded surface of said matrix layer of each of said unitized structures being disposed adjacent to and in substantially continuous contact with the catalyst layer of an adjacent unitized structure.

7. The improvement according to claim 1 wherein said gas distribution layers are fibrous carbon paper.

8. The improvement according to claim 1 wherein said layer of gas impermeable material is a graphite composite.

9. A unitized fuel cell stack component comprising:

a pair of porous gas distribution layers each having first and second opposing surfaces, said first surfaces facing each other, each of said layers including enough sufficiently large pores and said layers being sufficiently thick to permit a substantially free flow of a reactant gas therethrough both perpendicular to and parallel to the planes of their surfaces;

a continuous layer of gas impermeable material disposed between, bonded to, and in substantially continuous contact with said first surfaces of said gas distribution layers;

an anode catalyst layer in substantially continuous contact with and bonded to said second surface of one of said gas distribution layers; and a cathode catalyst layer in substantially continuous contact with and bonded to said second surface of said other gas distribution layer, each of said gas distribution layers also including a thin fine pore layer defining said second surface and a thicker larger pore layer behind said fine pore layer, said fine pores sized to permit a catalyst layer to be applied thereto without a substantial amount of catalyst entering said pores, at least one of said pair of gas distribution layers including means defining an electrolyte reservoir region in communication with the electrolyte space between said catalyst layers.

10. The unitized fuel cell stack component according to claim 9 including a matrix layer adapted to retain electrolyte, said matrix layer being bonded to and in substantially continuous contact with either of said catalyst layers.

11. In a cell stack comprising a plurality of electrochemical cells, each cell comprising an anode catalyst layer spaced apart from a cathode catalyst layer, the space therebetween adapted to have electrolyte disposed therein, the improvement comprising:

a continuous layer of gas impermeable material disposed between and spaced from the anode catalyst layer of one cell and the cathode catalyst layer of the next adjacent cell; and a member consisting essentially of porous material filling the space between each of said catalyst layers and said layer of gas impermeable material, each member having first and second opposing surfaces, said first surface being in substantially continuous contact with said layer of gas impermeable material, said second surface being in substantially continuous contact with its associated catalyst layer, said members each including a gas porous gas distribution layer, said gas distribution layer being sufficiently thick and including enough pores sufficiently large to permit a substantially free flow of reactant gas therethrough both perpendicular to and parallel to said layer, at least one of said members of each cell also including an electrolyte porous reservoir layer disposed between and in substantially continuous contact with said gas distribution layer of said one member and said layer of gas impermeable material adjacent said one member, said one member additionally including uniformly distributed discrete areas of hydrophilic material extending through said gas distribution layer thereof from said reservoir layer to its associated catalyst layer for providing wicking paths for electrolyte to travel through said gas distribution layer to said reservoir layer, each of said gas distribution layers also including a thin fine pore layer defining said second surface and a thicker larger pore layer behind said fine pore layer, said fine pores sized to permit a catalyst layer to be applied thereto without a substantial amount of catalyst entering said pores.

12. In a cell stack comprising a plurality of electrochemical cells, each cell comprising an anode catalyst layer spaced apart from a cathode catalyst layer, the space therebetween adpated to have electrolyte disposed therein, the improvement comprising:
- a continuous layer of gas impermeable material having opposing surfaces and disposed between and spaced from the anode catalyst layer of one cell and the cathode catalyst layer of a next adjacent cell;
- a gas porous gas distribution layer disposed on each side of said layer of gas impermeable material in the spaces between said layer of gas impermeable material and said catalyst layers, said gas distribution layers being sufficiently thick and including enough pores sufficiently large to permit a substantially free flow of a reactant gas therethrough both perpendicular to and parallel to said layers, said gas distribution layers each having first and second opposing surfaces, said second surface of one of said gas distribution layers being in substantially continuous contact with said anode catalyst layer of said one cell, said second surface of said other gas distribution layer being in substantially continuous contact with said cathode catalyst layer of said next adjacent cell, said first surface to one of said pair of gas distribution layers being in substantially continuous contact with one of said surfaces of said layer of gas impermeable material, each of said gas distribution layers also including a thin fine pore layer defining said second surface and a thicker larger pore layer behind said fine pore layer, said fine pores sized to permit a catalyst layer to be applied thereto without a substantial amount of catalyst entering said pores; and
- an electrolyte retaining matrix disposed between said cell anode and cathode catalyst layers, an electrolyte porous reservoir layer having opposing surfaces, said reservoir layer being disposed between and having its opposing surfaces in substantially continuous contact with, respectively, said layer of gas impermeable material and said other one of said pair of gas distribution layers, and means providing an electrolyte path from said matrix to said reservoir layer.

13. A unitized fuel cell stack component comprising:
- a pair of flat, porous members each having first and second opposing surfaces, said first surfaces facing each other, said members each including a gas porous gas distribution layer, one of said members including an electrolyte reservoir layer in substantially continuous contact with said gas distribution layer of said one member, each of said gas distribution layers including enough sufficiently large pores and said layers being sufficiently thick to permit a substantially free flow of a reactant gas therethrough both perpendicular to and parallel to the planes of said surfaces;
- a continuous layer of gas impermeable material disposed between, bonded to and in substantially continuous contact with said first surfaces of said members;
- an anode catalyst layer in substantially continuous contact with and bonded to said second surface of one of said pair of members; and
- a cathode catalyst layer in substantially continuous contact with and bonded to said second surface of said other of said pair of members, each of said gas distribution layers also including a thin fine pore layer defining said second surface and a thicker larger pore layer behind said fine pore layer, said fine pores sized to permit a catalyst layer to be applied thereto without a substantial amount of catalyst entering said pores.

14. The unitized fuel cell stack component according to claim 13 including a matrix layer adapted to retain electrolyte, said matrix layer being bonded to and in substantially continuous contact with either of said catalyst layers.

* * * * *